US010967454B2

(12) United States Patent
Gould et al.

(10) Patent No.: US 10,967,454 B2
(45) Date of Patent: Apr. 6, 2021

(54) CAPACITIVE DISCHARGE WELDING SYSTEM

(71) Applicant: EDISON WELDING INSTITUTE, INC., Columbus, OH (US)

(72) Inventors: Jerry E. Gould, Columbus, OH (US); Samuel Lewis, Columbus, OH (US)

(*) Notice: Subject to any disclaimer, the term of this patent is extended or adjusted under 35 U.S.C. 154(b) by 853 days.

(21) Appl. No.: 15/620,203

(22) Filed: Jun. 12, 2017

(65) Prior Publication Data
US 2018/0093344 A1 Apr. 5, 2018

Related U.S. Application Data

(60) Provisional application No. 62/348,463, filed on Jun. 10, 2016.

(51) Int. Cl.
*B23K 11/26* (2006.01)
*B23K 11/36* (2006.01)
*B23K 11/24* (2006.01)

(52) U.S. Cl.
CPC .............. *B23K 11/26* (2013.01); *B23K 11/24* (2013.01); *B23K 11/36* (2013.01)

(58) Field of Classification Search
CPC .......... B23K 11/24; B23K 11/26; B23K 11/36
USPC ... 219/113, 116, 112, 130.1, 130.21, 137 PS
See application file for complete search history.

(56) References Cited

U.S. PATENT DOCUMENTS

| | | | | |
|---|---|---|---|---|
| 5,264,679 A | * | 11/1993 | Martin ................. | B23K 9/0672 219/130.4 |
| 5,965,038 A | * | 10/1999 | Nomura ................. | B23K 11/24 219/110 |
| 6,459,065 B2 | * | 10/2002 | Watanabe ............ | B23K 11/241 219/113 |
| 8,937,263 B2 | * | 1/2015 | Gunning .............. | B23K 9/1081 219/113 |

* cited by examiner

*Primary Examiner* — Dana Ross
*Assistant Examiner* — James F Sims, III (57) ABSTRACT

A capacitive discharge welding system includes at least one capacitive discharge-based power supply that is adapted to provide alternate polarity pulses from a first weld to a subsequent weld, and to be compatible with iron-core transformers used for alternating current resistance welding; at least one iron core transformer adapted to receive electrical discharges from the capacitive discharge-based power supply; a polarity switching network that includes at least two sets of silicon controlled rectifiers that are arranged in pairs for facilitating current flow in alternate directions; a pair of engagable, properly biased shunt diodes that are operative to shunt reflected current for protecting the silicon controlled rectifiers when the system is in use; and a control network configured for simultaneous engagement of the properly biased shunt diodes and firing the silicon controlled rectifiers for current flow; and tracking polarity for assuring that subsequent pulses use opposite direction current flow for preventing saturation of the iron core transformer.

4 Claims, 6 Drawing Sheets

| Main Low | | | | | | | | | |
|---|---|---|---|---|---|---|---|---|---|
| | | Main Tap | | | | | | | |
| | | 1 | 2 | 3 | 4 | 5 | 6 | 7 | 8 |
| Auto Tap | 1 | 1625 | 1535 | 1435 | 1381 | 1315 | 1270 | 1214 | 1163 |
| | 2 | 850 | 789 | 742 | 708 | 674 | 642 | 617 | 594 |
| | 3 | 567 | 529 | 498 | 472 | 449 | 428 | 411 | 396 |
| | 4 | 425 | 397 | 373 | 353 | 337 | 321 | 309 | 297 |
| | 5 | 341 | 318 | 299 | 283 | 270 | 256 | 247 | 238 |
| | 6 | 283 | 265 | 248 | 235 | 225 | 214 | 206 | 198 |
| | 7 | 243 | 227 | 213 | 202 | 193 | 183 | 177 | 169 |
| | 8 | 213 | 199 | 187 | 177 | 168 | 160 | 154 | 148 |

| Main Hi | | | | | | | | | |
|---|---|---|---|---|---|---|---|---|---|
| | | Main Tap | | | | | | | |
| | | 1 | 2 | 3 | 4 | 5 | 6 | 7 | 8 |
| Auto Tap | 1 | 1094 | 987 | 891 | 813 | 752 | 686 | 639 | 594 |
| | 2 | 553 | 498 | 451 | 411 | 378 | 345 | 322 | 298 |
| | 3 | 370 | 332 | 300 | 274 | 252 | 231 | 215 | 199 |
| | 4 | 278 | 249 | 226 | 205 | 190 | 174 | 162 | 150 |
| | 5 | 223 | 201 | 181 | 165 | 152 | 139 | 129 | 119 |
| | 6 | 185 | 167 | 151 | 137 | 126 | 116 | 107 | 100 |
| | 7 | 159 | 143 | 129 | 117 | 108 | 99 | 92 | 85 |
| | 8 | 139 | 125 | 113 | 103 | 95 | 87 | 81 | 75 |

| Auto Tap Out | | 1 | 2 | 3 | 4 | 5 | 6 | 7 | 8 |
|---|---|---|---|---|---|---|---|---|---|
| | Low | 213 | 199 | 187 | 177 | 169 | 161 | 155 | 149 |
| | Hi | 139 | 125 | 113 | 103 | 95 | 87 | 80 | 75 |

CAPACITIVE DISCHARGE WELDING SYSTEM

CROSS-REFERENCE TO RELATED APPLICATIONS

This patent application claims the benefit of U.S. Provisional Patent Application Ser. No. 62/348,463 filed on Jun. 10, 2016 and entitled "Capacitive Discharge Welding System", the disclosure of which is hereby incorporated by reference herein in its entirety and made part of the present U.S. utility patent application for all purposes.

BACKGROUND OF THE INVENTION

The described invention relates in general to resistance and solid state solid-state welding systems and the components thereof, and more specifically to a welding system that includes a capacitive discharge based power supply coupled with a polarity reversing firing mechanism and iron-core transformer arrangement for providing a fine level of impedance matching between capacitive-based stored energy and a secondary resistive/inductive load of a workpiece.

Capacitive discharge (CD) welding is a variation of resistance projection welding, wherein electrical power is stored in a capacitor, and then discharged through a transformer into one or more workpieces. Each workpiece itself nominally contains some variant of an energy concentrator, thereby facilitating localized heating and subsequent forging. CD welding is used in various applications including, for example, specialized automotive components, industrial instruments, sensors, and appliances. However, broader application of the technology has been limited by a number of factors including: (i) large scale of required equipment (e.g., physical size of the power supplies); (ii) excessive cost; (iii) and limited system flexibility. CD welding is known to be cost effective and robust; however, systems are relatively inflexible and are typically configured with only the end application or use being considered with regard to system design.

Particularly problematic are the types of transformers typically used with CD welding systems. Most production CD welding systems currently in use employ air core style transformers that typically include very limited turns-ratios for matching capacitor output to the workpiece load. In such systems, the delivered power is notionally unipolar, thereby preventing the use of more flexible stacked core transformers. The result is that there is often insufficient matching between capabilities of the system power supply and the requirements of the application for which the welding system is to be used. Thus, there is an ongoing need for a capacitive discharge welding system with enhanced impedance matching capability for making the system generally more flexible for use in various applications.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first capacitive discharge welding system is provided. This capacitive discharge welding system includes at least one capacitive discharge-based power supply, wherein the capacitive discharge-based power supply is adapted to provide alternate polarity pulses from a first weld to a subsequent weld, and wherein the capacitive discharge-based power supply is adapted to be compatible with iron-core transformers used for alternating current resistance welding; a polarity switching network, wherein the polarity switching network includes at least two sets of silicon-controlled rectifiers, and wherein the at least two sets of silicon-controlled rectifiers are arranged in pairs for facilitating current flow in alternate directions; and a pair of engageable properly biased shunt diodes, wherein the pair of engageable properly biased shunt diodes are operative to shunt a reflected current, and wherein shunting the reflected current protects the silicon controlled rectifiers when the system is in use.

In accordance with another aspect of the present invention, a second capacitive discharge welding system is provided. This capacitive discharge welding system includes at least one capacitive discharge-based power supply, wherein the capacitive discharge-based power supply is adapted to provide alternate polarity pulses from a first weld to a subsequent weld, and wherein the capacitive discharge-based power supply is adapted to be compatible with iron-core transformers used for alternating current resistance welding; at least one iron core transformer adapted to receive electrical discharges from the capacitive discharge-based power supply, wherein the iron-core transformer includes 128 sets of windings ratios having values ranging from 75:1 up to 1625:1, and having maximum step changes of about 5%; a polarity switching network, wherein the polarity switching network includes at least two sets of silicon-controlled rectifiers, and wherein the at least two sets of silicon-controlled rectifiers are arranged in pairs for facilitating current flow in alternate directions; and a pair of engageable properly biased shunt diodes, wherein the pair of engageable properly biased shunt diodes are operative to a shunt reflected current, and wherein shunting the reflected current protects the silicon-controlled rectifiers when the system is in use.

In accordance with still another aspect of the present invention, a third capacitive discharge welding system is provided. This capacitive discharge welding system includes at least one capacitive discharge-based power supply that is adapted to provide alternate polarity pulses from a first weld to a subsequent weld, and to be compatible with iron-core transformers used for alternating current resistance welding; at least one iron core transformer adapted to receive electrical discharges from the capacitive discharge-based power supply; a polarity switching network that includes at least two sets of silicon-controlled rectifiers that are arranged in pairs for facilitating current flow in alternate directions; a pair of engageable, properly biased shunt diodes that are operative to shunt a reflected current for protecting the silicon-controlled rectifiers when the system is in use; and a control network configured for simultaneous engagement of the properly biased shunt diodes and firing the silicon-controlled rectifiers for current flow; and tracking polarity for assuring that subsequent pulses use opposite direction current flow for preventing saturation of the iron core transformer.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides various enhancements to conventional capacitive discharge (CD) welding systems. Conventional CD systems typically include a high voltage power supply (e.g., up to ~3500V) coupled with a series of capacitors for storing energy. Welding occurs by discharge of the capacitors through a welding transformer (for impedance matching) into a workpiece (e.g., a weld nut or other part). The output of the capacitors in conventional systems is unipolar direct current, meaning conventional iron-core transformer arrangements cannot be used. Accordingly, such systems typically employ air-core or air-gap transformers for impedance matching (i.e., matching the capacitor discharge voltage to those necessary for achieving the desired current profile on the secondary coil). These transformers are generally limited to a few widely spaced windings ratios, thus minimizing the potential for optimizing impedance matching from primary to secondary windings.

Iron-core transformers are commonly used for certain types of resistance welding applications. Iron-core transformer arrangements typically possess extremely high magnetic permeability, resulting in definable magnetic flux paths. This particular characteristic permits a wide variety of windings ratios and impedance matching characteristics. However, such systems also demonstrate saturation at relatively low magnetic field strengths, necessitating polarity reversals in order to maintain functionality. For conventional CD welding systems, this reversal of polarity is not possible. Thus, the present invention provides a capacitor discharge based power supply coupled with a polarity reversing firing mechanism and iron-core transformer arrangement.

Figure 1:
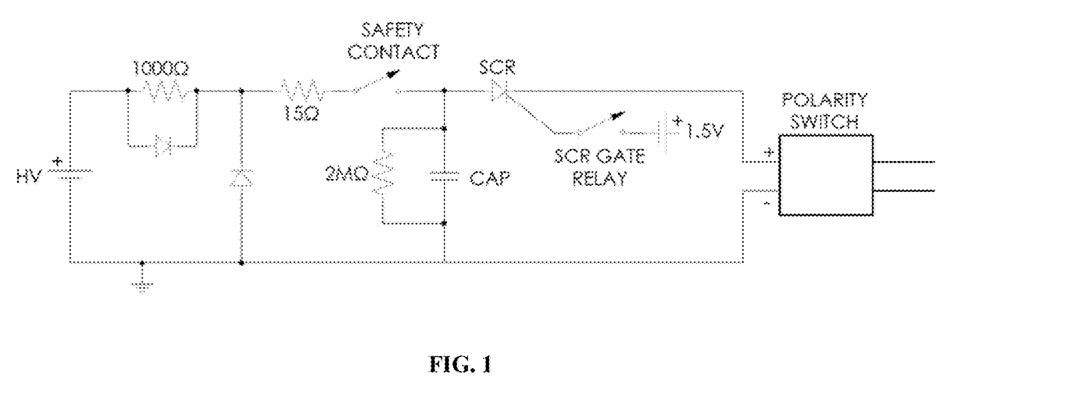
FIG. 1 is a schematic diagram of an exemplary capacitive discharge power supply configuration used for the open architecture CD welding system of the present invention.

With reference to FIG. 1, which provides a schematic diagram of an exemplary capacitive discharge power supply configuration used for the CD welding system of the present invention, the baseline power supply was designed to allow maximum internal flexibility (variations in capacitors, charge voltages) while interfacing with existing welding equipment incorporating stacked core transformers. The primary circuitry is shown in FIG. 1. The capacitor itself is charged by a nominal maximum 3000V power supply. The capacitor is discharged into the welding circuit by a silicon controlled rectifier (SCR). The circuitry is specifically designed for interfacing with a stacked core welding transformer. The use of a stacked core transformer necessitates polarity switching to prevent saturation from discharge to discharge. Therefore, a polarity switch is included just upstream from the welding transformer. The system circuitry also contains various levels of protection circuits, which includes a passive discharge circuit for preventing stored charge on the capacitor. The passive circuit employs a 100 kΩ resistor continuously connected across the capacitor to provide continuous discharge in the event of control failure. Also included is protection to prevent current flow during under-damped conditions back into the charging power supply. Finally, the SCR gate was isolated from the rest of the power circuit. A separate battery based power supply is used for firing.

Figure 2:
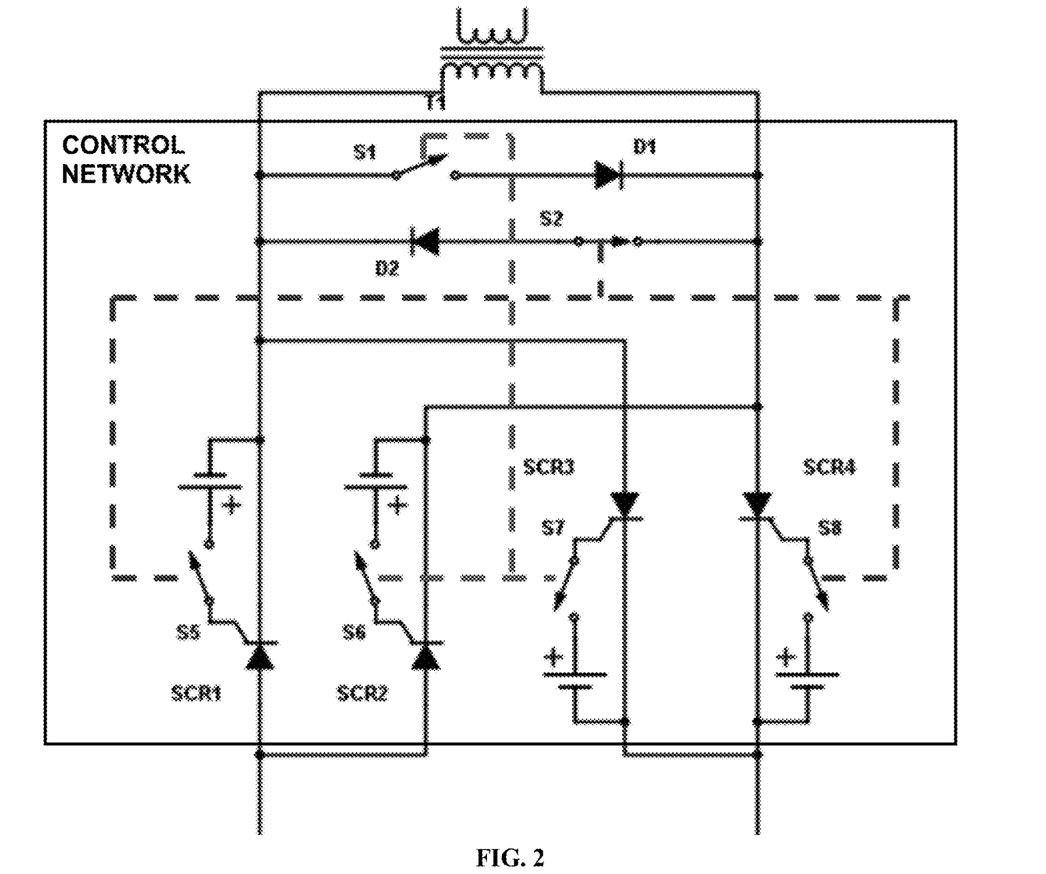
FIG. 2 is a schematic diagram of an exemplary embodiment of the polarity reversing firing circuit that is coupled with the capacitive discharge power supply of the CD welding system of the present invention.

As previously stated, in an exemplary embodiment of this invention, the capacitor discharge based power supply is coupled with a polarity reversing firing mechanism/circuit and iron-core transformer arrangement. The control mechanism on the system assures that each subsequent capacitor discharge fires at a reversed polarity. This polarity reversal then facilitates the use of such iron-core transformers. FIG.

2 provides a schematic diagram of an exemplary embodiment of the polarity reversing firing circuit coupled with the capacitive discharge power supply of the CD welding system of the present invention. As shown in FIG. 2, the firing circuit includes: (i) two sets of SCRs for facilitating alternate polarity conduction when fired; and (ii) two shunting diodes for preventing damage to the SCRs. As indicated in FIG. 2, to achieve conduction with a predetermined polarity, two SCR's are fired simultaneously to complete the circuit. Additionally, one of the shunting diodes is engaged at the same time to protect the SCRs when current is flowing in that direction. The two networks (i.e., two SCRs and one shunt diode) are alternately engaged to achieve switching polarity on successive welds. Welding firing is controlled by a PLC.

Figure 3:
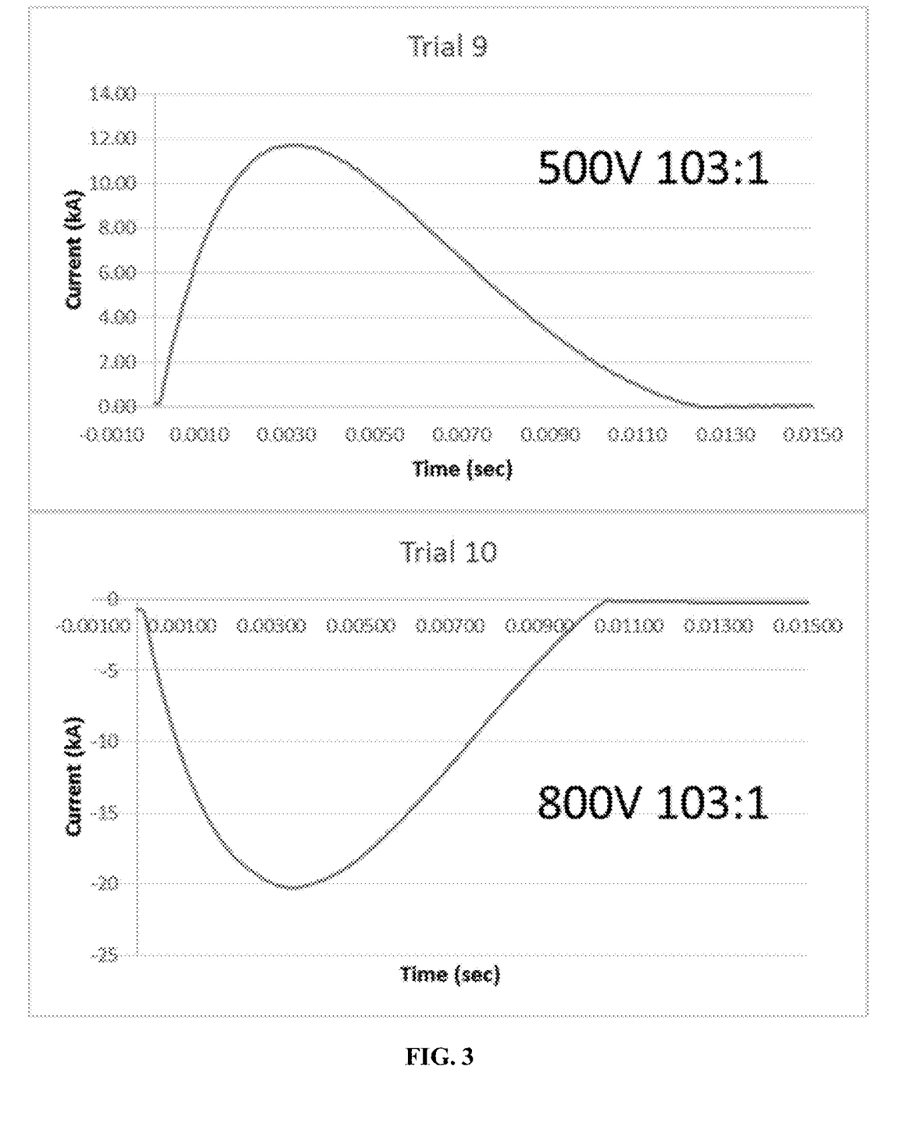
FIG. 3 includes two charts that present data demonstrating the reverse polarity waveforms from successive welds using the process of the present invention, wherein the current waveforms are identical with the exception of the inversion caused by the polarity switch.

An exemplary control methodology allows implantation of alternating polarities from weld to weld and includes: (i) a mechanism to track polarity of the most recent weld, and (ii) engagement of appropriate contacts to facilitate proper operation of the discharge circuit. Elements include providing simultaneous fire pulses to SCRs for a desired polarity, engagement of the appropriately biased shunting diode, and following welding, memory of the polarity, which is used to fire the reverse network on the subsequent weld. This firing network then facilitates integration with a stacked-core transformer arrangement embedded in an existing welding frame. This system includes a main transformer with a parallel/series tap switch arrangement, and an upstream auto-transformer with eight additional tap switches. Current waveforms resulting from such polarity switching are provided in FIG. 3, which demonstrates the alternate polarity current flow resulting from this switching network. FIG. 3 includes two charts that present data demonstrating the reverse polarity waveforms from successive welds using the process of the present invention, wherein the current waveforms are identical with the exception of the inversion caused by the polarity switch.

Figure 4:
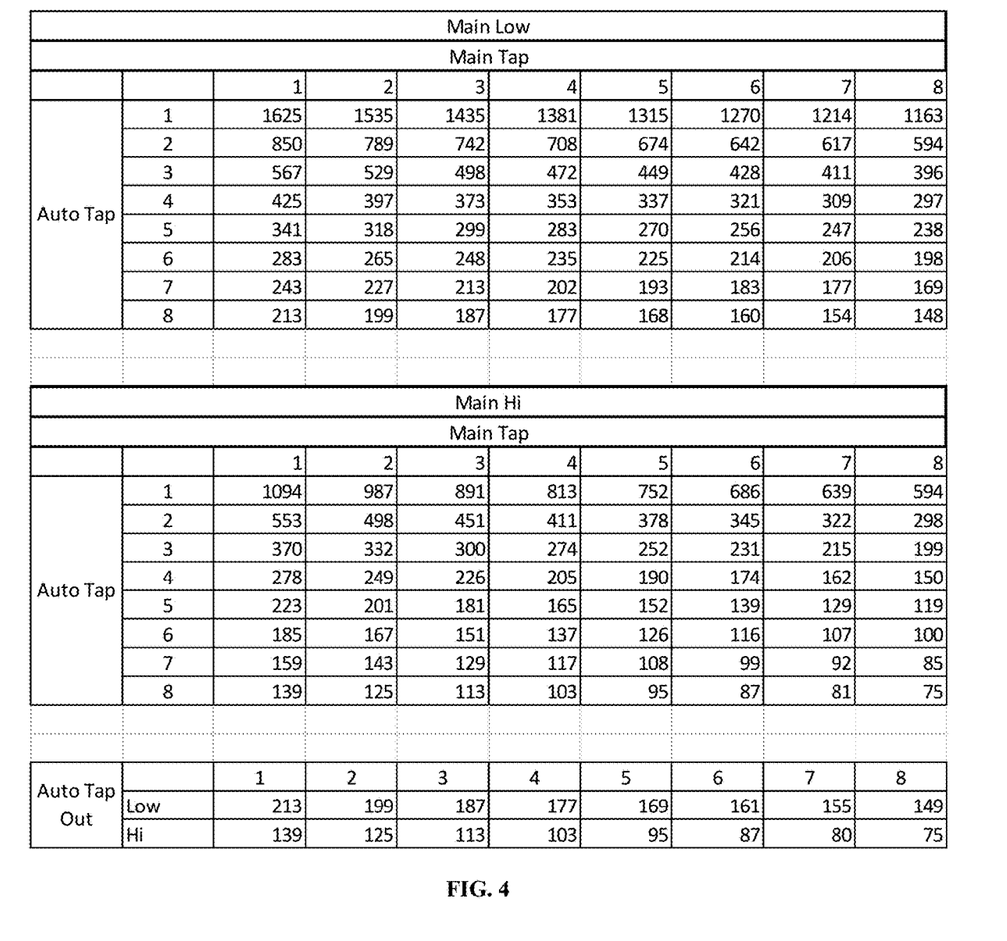
FIG. 4 includes various tables that list turns ratios possible with the stacked core transformer and autotransformer used in exemplary embodiments of the CD welding system of the present invention.

An exemplary stacked iron-core transformer used with the present invention incorporates 128 sets of windings ratios with values ranging from 75:1 up to 1625:1 with maximum step changes of ~5%. Specific windings ratios resulting from this transformer arrangement are provided in FIG. 4, which includes various tables that list turns ratios possible with the stacked core transformer and autotransformer used with the present invention. This configuration allows precise impedance matching between the electrical primary and secondary coils, which is not available in currently available CD welding systems. Functionally, this system is capable of allowing independent control of peak currents and rise times for specific welding applications.

Figure 5:
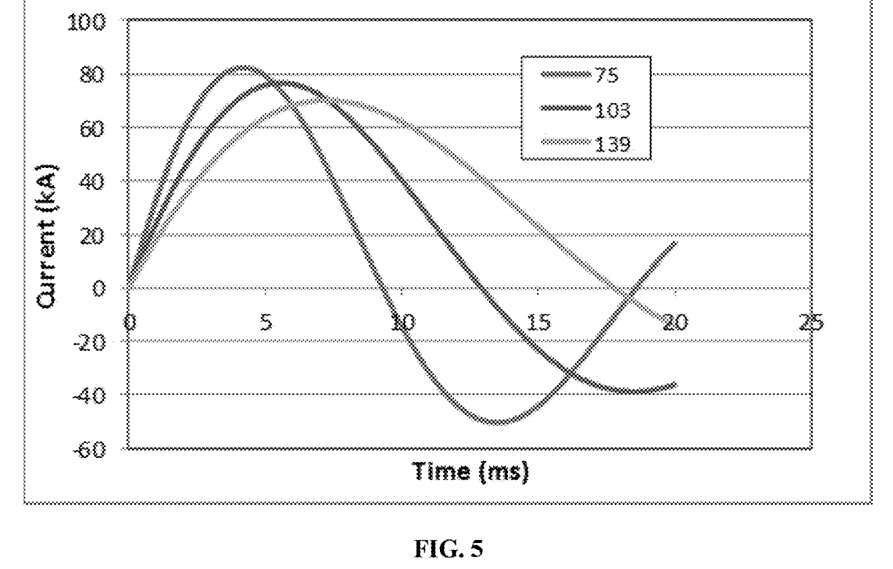
FIG. 5 is a table that includes data from an exemplary circuit analysis illustrating the manner in which changing transformer windings ratio at otherwise fixed conditions alters current rise time while holding the peak magnitude relatively stable (analysis was done for conditions including a charge voltage of 1500-V, a system capacitance of 2000-g, a load resistance of 80-μΩ, and a secondary inductance of 760-pH; and variation in transformer windings ratios are shown in the Figure)
Figure 6:
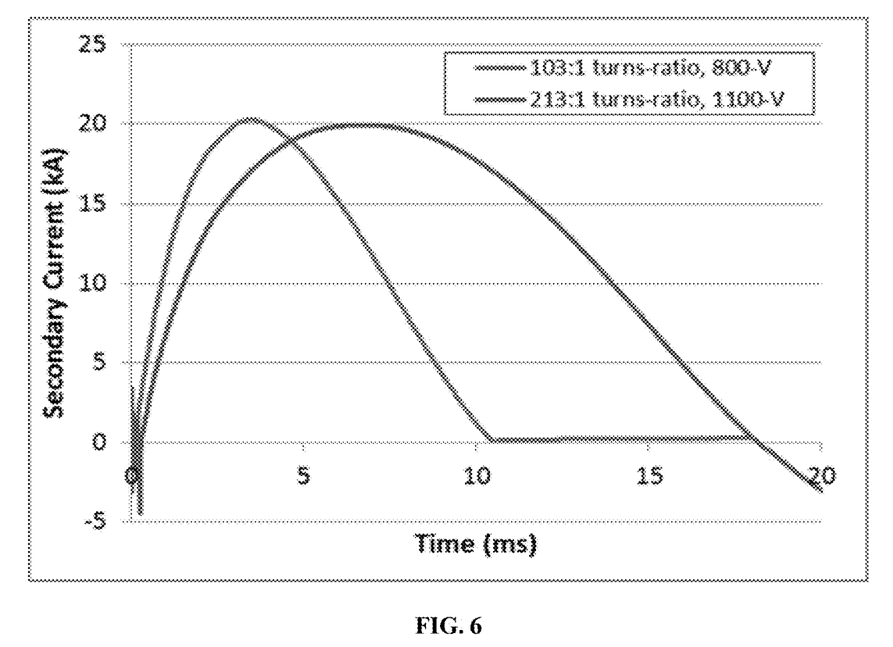
FIG. 6 is a table that illustrates two measured waveforms from welds made with different transformer windings ratios, wherein the voltages have been adjusted to maintain the same peak current, thereby demonstrating that rise time to peak current can be controlled independently of the peak current itself (welds were made at turns ratios of 103:1 and 213:1, as indicated in the Figure; system capacitance was 20-μF; the 103:1 turns ratio weld was made at 800-V; and the 213:1 turns ratio weld was made at 1100-V)

An analytical assessment of the influence of windings ratio on current profile is shown in FIG. 5, which is a table that includes data from an exemplary circuit analysis illustrating the manner in which changing transformer windings ratio at otherwise fixed conditions alters current rise time while holding the peak magnitude relatively stable. This analysis was done for conditions including a charge voltage of 1500-V, a system capacitance of 2000-g, a load resistance of 80-$\mu\Omega$, and a secondary inductance of 760-pH. Variation in transformer windings ratios are shown in FIG. 5. The data present in FIG. 5, demonstrates that for a fixed system capacitance and charge voltage, changing the transformer turns ratio allows variations in rise time with only limited changes in the peak current. The effect is shown experimentally in FIG. 6, which is a table that illustrates two measured waveforms from welds made with different transformer windings ratios, wherein the voltages have been adjusted to maintain the same peak current, thereby demonstrating that rise time to peak current can be controlled independently of the peak current itself. Rise times are double with a similar proportional increase in the windings ratio and charge voltages have been changed to assure similar peak currents. For this analysis, welds were made at turns ratios of 103:1 and 213:1; system capacitance was 20-$\mu$F; the 103:1 turns ratio weld was made at 800-V; and the 213:1 turns ratio weld was made at 1100-V.

Figure 7:
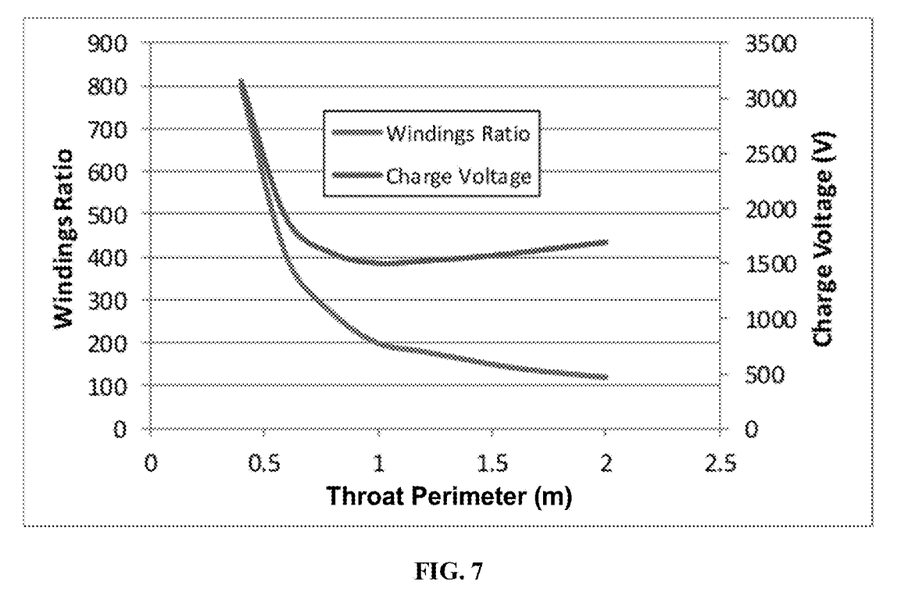
FIG. 7 is a table that includes data from an analysis of the changes in windings ratio and system charge voltage necessary for maintaining the same peak current and rise time for variations in the welder secondary throat size (analysis was done assuming a system capacitance of 2000-g and a workpiece resistance of 80-μΩ)
Figure 8:
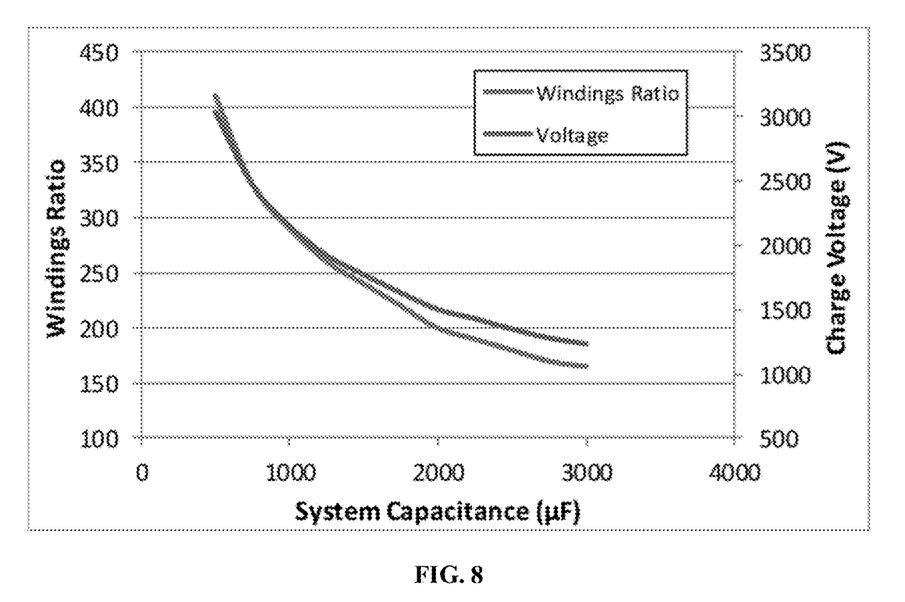
FIG. 8 is a table that includes data from an analysis of the changes in windings ratio and charge voltage necessary for maintaining the same peak current and rise time for variations in system capacitance (analysis was done assuming a secondary loop perimeter of 1-m and a load resistance of 80-μΩ).

Information regarding how the present invention can be used for process optimization is presented in FIGS. 7-8. FIG. 7 is a table that includes data from an analysis of the changes in windings ratio and system charge voltage necessary for maintaining the same peak current and rise time for variations in the welder secondary throat size. This analysis was completed assuming a system capacitance of 2000-$\mu$F and a workpiece resistance of 80-$\mu\Omega$. FIG. 7 demonstrates the combinations of windings ratios and charge voltages required to maintain peak currents and rise times as the welder throat size is increased. In this situation, a square throat is considered and the perimeter of the enclosed area is included as the independent variable in FIG. 7. Increasing throat areas typically require lower windings ratios and charge voltages to maintain current profiles.

FIG. 8 is a table that includes data from an analysis of the changes in windings ratio and charge voltage necessary for maintaining the same peak current and rise time for variations in system capacitance. This analysis was completed assuming a secondary loop perimeter of 1-m and a load resistance of 80-$\mu\Omega$. The experiment behind FIG. 8 further examined required windings ratios and charge voltages as system capacitance increases. Similar to increased welder throat sizes, higher system capacitances necessitate lower windings ratios and charge voltages to maintain a specific secondary current profile. The capability for such system optimization has significant positive influence on joint performance, reproducibility, and metallurgy. Thus, this invention permits optimization of the CD welding process with precision that is not currently available on commercially available units.

The present invention also enables a wider application of CD welding technology than was previously possible due to the inability of existing systems to independently modify and adjust the primary power supply, impedance matching system, secondary electrical system, and mechanical systems. This invention allows potential system users to identify best practice system design criterion before machine purchase, and allows creation of application specific specifications facilitating first time best practice machine designs and systems (e.g., better matching of workpieces to power supply). Important advantages of this invention include: (i) novel polarity switching that enables the use of iron-core transformers; (ii) novel control systems assuring discharge to discharge polarity switching; and (iii) an enhanced transformer that allows improved impedance matching between primary and secondary coils for specific applications. Other advantages include replacement of air-core transformers with iron-core transformers, resulting in reduced machine costs; the potential for the development of robotic CD welding systems; and the application of CD welding to reactive metals (e.g. aluminum).

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A capacitive discharge welding system, comprising:
   (a) at least one capacitive discharge-based power supply, wherein the capacitive discharge-based power supply is adapted to provide alternate polarity pulses from a first weld to a subsequent weld;
   (b) at least one iron core transformer used for alternating current resistance welding, wherein the at least one iron core transformer is adapted to receive electrical discharges from the capacitive discharge-based power supply, and wherein the iron-core transformer includes 128 sets of windings ratios having values ranging from 75:1 up to 1625:1 and having maximum step changes of about 5%;
   (c) a polarity switching network,
      (i) wherein the polarity switching network includes at least two sets of silicon-controlled rectifiers, and
      (ii) wherein the at least two sets of silicon-controlled rectifiers are arranged in pairs for facilitating current flow in alternate directions; and
   (d) a pair of engageable properly biased shunt diodes, wherein the pair of engageable properly biased shunt diodes are operative to shunt a reflected current, and wherein shunting the reflected current protects the silicon-controlled rectifiers when the system is in use.

2. The system of claim 1, further comprising a control network,
   (i) wherein the control network is configured for
      a) simultaneous engagement of the properly biased shunt diodes, and
      b) firing the silicon-controlled rectifiers for current flow; and
   (ii) tracking polarity for assuring that subsequent pulses use opposite direction current flow for preventing saturation of the at least one iron core transformer.

3. The system of claim 1, wherein the capacitive discharge-based power supply and the at least one iron core transformer are configured to permit independent variations of secondary current rise times and peak values.

4. The system of claim 3, wherein the capacitive discharge-based power supply, at least one iron core transformer, and control network are integrated with one another and are configured to compensate for a range of secondary throat areas and primary capacitances while maintaining secondary current rise times and peak values based on system charge voltage and the winding ratios of the iron core transformer.

* * * * *